United States Patent [19]

Kanbe et al.

[11] Patent Number: 4,532,190
[45] Date of Patent: Jul. 30, 1985

[54] METAL-CERAMICS COMPOSITE MATERIALS

[75] Inventors: Rokuro Kanbe, Aichi; Kazuo Kimura, Komaki, both of Japan

[73] Assignee: 501 NGK Spark Plug Co., Ltd., Aichi, Japan

[21] Appl. No.: 535,050

[22] Filed: Sep. 23, 1983

[30] Foreign Application Priority Data

Sep. 25, 1982 [JP]  Japan .............................. 57-167030

[51] Int. Cl.³ .............................................. B32B 15/04
[52] U.S. Cl. ...................................... 428/627; 428/632; 428/660; 428/661; 428/663; 428/671; 428/674; 428/675
[58] Field of Search ............... 428/627, 660, 661, 663, 428/671, 674, 675, 632

[56] References Cited

U.S. PATENT DOCUMENTS

| | | | |
|---|---|---|---|
| 3,664,868 | 5/1972 | Davis et al. | 428/661 |
| 4,293,619 | 10/1981 | Landingham et al. | 428/661 |
| 4,305,998 | 12/1981 | Manty et al. | 428/661 |

Primary Examiner—Veronica O'Keefe
Attorney, Agent, or Firm—Wegner & Bretschneider

[57] ABSTRACT

A metal-ceramics composite material is produced by forming a metal film comprised of three layers on a ceramic substrate, and laminating a metal member thereon, the metal film comprising first layer of Group IV a metal, second layer of Group VIa metal and third layer of Group Ib metal, wherein the first and second layers are formed by gas deposition technique and the Group Ib layer may be formed by gas deposition technique or electrochemical plating. An additional Group VIII metal layer may be interposed between Group VIa layer and Group Ib layer by gas deposition technique.

15 Claims, 1 Drawing Figure

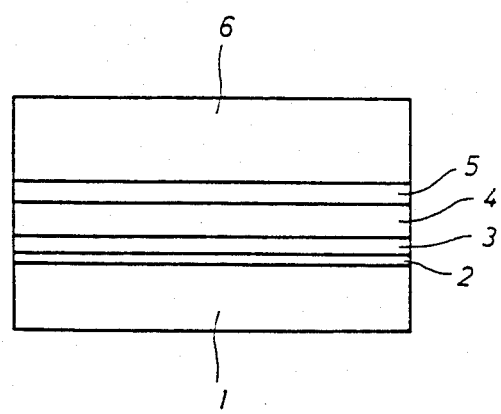

METAL-CERAMICS COMPOSITE MATERIALS

FIELD OF THE INVENTION

The present invention relates to metal-ceramics composite materials, and more particularly to such composite materials that can show durability in structural integrity even upon receiving external forces and thermal stress.

BACKGROUND

Ceramics generally excel in heat resistance, thermal impact strength, mechanical strength at high temperatures, wear resistance or insulating properties, and are best suited for use in parts or members used under severe conditions. However, there is indeed a little chance of using ceramics alone. For instance, in mechanical parts, ceramics is used in combination with other materials such as metals to fulfill the desired function.

However, since it is difficult to bond ceramics directly to metal, those skilled in the art have relied upon the process which involves metallizing the surface of ceramics by certain techniques and, thereafter, bonding a metal piece to the metallized surface of ceramics. To this end, use has been made of: the high-melting point metal technique in which a metallized paste is deposited onto the surface of ceramics by screen printing and, thereafter, the resulting product is heated in a non-oxidizing atmosphere; the active technique method in which a highly active metal (Ti, Zr) is placed on the surface of ceramics, and the whole is heated in a vacuum vessel or in an inert atmosphere; and the physical deposition technique in which a metal is ignited or heated intensely in vacuo, and the resulting vapor is deposited onto the surface of ceramics.

However, limitation has been put upon the type of ceramics to be deposited with a metal layer in the case of merely laminating such a layer onto ceramics, for example, in the case of the high-melting point metal technique using molybdenum and manganese. For instance, when the ceramic is silicon nitride, the amount of oxides contained in the ceramic, capable of forming a reaction phase with molybdenum and manganese, is so small that the metal-to-ceramics bonding strength becomes insufficient. The active metal technique has the same drawback as the high-melting point metal technique. The physical deposition technique is also disadvantageous in that, when other metallic member is bonded to the deposited metal layer by high-temperature brazing such as silver brazing, thermal diffusion takes place depending upon the type of metal to be deposited, resulting in a lowering of the bonding strength of the deposited metal with ceramics.

When the ceramic is zirconia, it is expected that sufficiently high metal-to-ceramics bonding strength is obtained by the use of the high-melting point metal technique, since zirconia is an oxide having a thermal expansion coefficient greater than the aforesaid silicon nitride. In some cases, however, insufficient bonding strength may be achieved owing to a difference in the composition of ceramics. Even with a metal-ceramic combination having a sufficient bonding strength, there is a problem in connection with the reliability of that bonding strength, when it is subjected to repeated thermal stress.

Furthermore, when other metallic member is bonded to the aforesaid metal layer by, e.g., brazing, distortions appear depending upon the type of the metallic member to be used, with the result that the durability of the product still decreases as a whole. This is also true of the cases where other types of ceramics are bonded to the aforesaid metal film.

It thus has been required that a metal film be laminated onto the surface of ceramics with high bonding strength to bond a ceramic member to a metallic member or other ceramic member by, e.g, brazing. Nonetheless, any existing products fail to stand up to use under every possible circumstances due to the low reactivity of ceramics to a film-forming metal and the difference in the coefficient of thermal expansion therebetween.

SUMMARY OF THE DISCLOSURE

It is, therefore, a primary object of the present invention to provide a novel metal-ceramics composite material which can eliminate drawbacks named hereinabove.

As a result of intensive and extensive studies made in view of the foregoing problems to realize firm composite bonded products comprising ceramics and a metallic member or other ceramics, which excel in durability, have a wide use, and resist failure under a variety of circumstances, a composite having a damper effect upon thermal stress has been found as an intermediate structure of said composite bonded products.

According to one aspect of the present invention, there is provided a metal-ceramics composite material characterized in that a metal member of copper, gold, silver or platinum or an alloy thereof is laminated onto a metal film formed on the surface of ceramics, the metal film comprising: a first layer formed on the surface of ceramics by gas deposition technique, said first metal layer being comprised of one or more elements selected from the Group IVa of the periodic table, a second metal layer formed on the first metal layer by gas depostion technique, said second metal layer being comprised of one or more elements selected from the Group VIa of the periodic table and a third metal layer formed on the second metal layer by gas deposition technique or electrochemical plating, said third metal layer being comprised of one or more elements selected from the Group Ib of the periodic table.

According to another aspect of the present invention, there is provided a metal-ceramics composite material characterized in that a metal member of copper, gold, silver or platinum or an alloy thereof is laminated onto a metal film formed on the surface of ceramics, the metal film comprising:

a first metal layer formed on the surface of ceramics by gas deposition technique, said first metal layer being comprised of one or more elements selected from the Group IVa, a second metal layer formed on the first metal layer by gas deposition technique, said second metal layer being comprised of one or more elements selected from the Group VIa, a third metal layer formed on the second metal layer by gas deposition technique, said third metal layer being comprised of one or more elements selected from the Group VIII of the periodic table, and a fourth metal layer formed on the third metal layer by gas deposition technique or electrochemical plating, said fourth metal layer being comprised of one or two or more of the elements selected from the Group Ib.

BRIEF DESCRIPTION OF THE DRAWINGS

FIG. 1 is a front view of a test piece for bonding strength testing.

DETAILED DESCRIPTION OF THE PREFERRED EMBODIMENTS

The Group IVa elements refer to the group of titanium, zirconium and hafnium, the Group VIa elements to the group of chromium, molybdenum and tungsten, the Group Ib elements to a group of copper, silver and gold, and the Group VIII elements to a group of cobalt, nickel, ruthenium, rhodium, palladium, osmium, iridium and platinum. The grouping of the elements is based on the peiodic table presented in Iwanami Rikagaku Jiten, 3rd Ed. (1979), p.1484–5.

The term "ceramics" is herein used to indicate all the known ceramics i.e., oxides, nitrides, carbides etc. such as silicon nitride, zirconia, alumina, silicon carbide, or the like.

The gas deposition technique is a known technique in the art wherein metal or an alloy is deposited on a substrate from a gas state, e.g., encompassing vacuum deposition or vacuum plating, ion beam deposition, sputtering, chemical vapor deposition, ion plating and the like, which is characterized in that the selection of material and film thickness is optional. The electrochemical plating may be applied to the formation of the uppermost layer, and carried out in the known manner by electrolytic or electroless plating.

The Group IVa elements forming the first layer in contact with ceramics are highly active metals, and react well with nitrogen and oxygen contained in ceramics to yield intermediate layer of nitrides and oxides. For this reason, the first layer is firmly bonded to ceramics. Of the Group IVa elements, titanium and zirconium show the highest bonding strength with ceramics, and are preferable. The thickness of the first layer is usually in a range of 500 to 5000 Å and preferably in a range of 1000 to 2000 Å in view of heat resistance and impact resistance. When the first layer has a thickness of below 500 Å, there is no substantial reduction in difference in thermal expansion between ceramics and the metallic member bonded to other layer or the uppermost layer, thus leading to a drop of bonding strength. In a thickness exceeding 5000 Å, a difference in thermal expansions between the first layer per se and ceramics begins to have an adverse influence upon bonding strength.

The Group VIa elements forming the second layer have a coefficient of thermal expansion of 5.5 to $8.4 \times 10^{-6}/°C.$, which is relatively close to that of ceramics, i.e., 2.9 to $12 \times 10^{-6}/°C.$, and function as a damper member for thermal shocks, and also serve to increase the bonding strength of the first layer to ceramics due to their high activity. When a copper, gold, silver or platinum member is laminated by high-temperature brazing such as eutectic silver brazing, the second layer also produces a barrier effect, by which thermal diffusion of the Group Ib or VIII to the first layer owing to such high temperatures is prevented, which would otherwise lead to a drop of bonding strength.

The Group Ib elements form the third layer, which is the uppermost layer of the metal film according to the first aspect of the present invention, whereas the Group VIII elements form the third layer of the metal film according to the second aspect of the present invention. The thickness of the second layer approximately amounts to a range of 500–5000 Å, preferably 1000–2000 Å. If it is outside above thickness range, sufficient effect can not be obtained. The description of the first and second layers is common to the first and second aspects of the present invention.

The third layer according to the first aspect of the present invention is composed of the Group Ib elements which are especially rich in ductility so that they have an effect upon reductions in difference in thermal expansion between the third layer and the copper, gold, silver or platinum member laminated thereonto. Therefore, the greater the thickness of the third layer, the better the results. In view of the shape of the end product, the third layer desirably has a thickness of about 1 to about 20 microns, more preferably 2 to 5 microns, which preferably increases in proportion to a difference in the coefficient of thermal expansion between a substrate and the copper, gold, silver or platinum member, so that the absorption of stress of distortions due to such a difference can be enhanced. In addition to the gas deposition technique, the third layer may be formed by electrochemical plating such as electrolytic or electroless plating with virtually the same effect; however, it is preferable to use the gas deposition technique in view of the bonding strength of the third layer to the second layer.

As mentioned above, the metal film according to the first aspect of the present invention is a lamination of the first layer comprised of the Group IVa elements, the second layer comprised of the Group VIa elements and the third layer comprised of the Group Ib elements, as viewed from the side of ceramics.

On the other hand, the metal film according to the second aspect of the present invention is of the structure that an additional layer comprised of the Group VIII elements is interposed between said second and third layers according to the first aspect of the present invention. More specifically, the metal film according to the second aspect of the present invention is a lamination of a first layer comprised of the Group IVa elements, a second layer comprised of the Group VIa elements, a third layer comprised of the Group VIII elements and a fourth layer comprised of the Group Ib elements, as viewed from the side of ceramics. Of these four layers, the first, second and fourth layers correspond virtually to the first, second and third layers of the metal film according to the first aspect of the present invention.

Referring to the third layer consisting of the Group VIII elements and forming a part of the metal film according to the second aspect of the present invention, it serves to improve the wetting effect of silver brazing, etc. in the lamination of the copper, gold, silver or platinum member, in spite of the fact that it is coated with the fourth layer. This third layer has a thickness of usually about 500 to about 5000 Å and, preferably, 1000 to 2000 Å in consideration of a drop of bonding strength due to a difference in the coefficient of thermal expansion between this layer and other layers. The wetting effect drops in a thickness of below about 500 Å, whereas the bonding strength drops rapidly in a thickness exceeding about 5000 Å. This layer also serves to prevent oxidation and, hence, embrittlement of the second layer of the Group VIa elements, when the uppermost layer, i.e., the fourth layer comprised of the Group Ib elements is formed thereon by plating.

The member of copper, gold, silver or platinum or an alloys thereof to be laminated onto the uppermost layer of the metal film may be such that having a surface of copper, gold, silver or platinum or alloys thereof, the surface coming contact therewith. For example, use may be made of clad materials having their surface made of copper, gold, silver or platinum such as copper-/Invar/copper materials; metallic materials plated with such metals; and wire or sheet materials formed of copper, gold, silver or platinum or alloys thereof. When the copper, gold, silver or platinum member is used as a damper member for the bonding of other member, it may have a thickness of 0.01 mm or more. Lamination of the copper, gold, silver or platinum member may be carried out by, e.g., brazing or hot pressing or hot laminating, with the result that the uppermost layer is bonded to the copper, gold, silver or platinum surface of the copper, gold, silver or platinum member.

In the metal-ceramics composite materials as prepared according to the first aspect of the present invention, the copper, gold, silver or platinum member is firmly bonded to ceramics through the metal film. Thus, the composite materials of the present invention can absorb vigorous thermal impacts, stress or distortions due to a difference in thermal expansion, and retains durability and high bonding strength.

In addition to an effect similar to that of the composite material of the first aspect, the second aspect of the present invention assures that the wetting effect of silver brazing, etc. in the lamination of the copper, gold, silver or platinum member is improved owing to the presence of the third layer of the Group VIII elements in the metal film to increase further bonding strength, and that the oxidation of the second layer is prevented during plating procedure resulting in a firmer bonding strength.

The metal-ceramics composite materials according to the first and second aspects of the present invention are used as parts of electro-insulating heat-radiating fins for transformers to join tranformers' bodies to metal fins by interposing the composite materials therebetween and as the heat- and wear-resistant parts for automobiles, and are employed to reduce the weight of other apparatus and afford thereto heat resistance and wear resistance. When not bonded to another member, the copper, gold, silver or platinum member can be used as a conductive layer.

The present invention will now be explained in detail with reference to the following non-restrictive examples.

EXAMPLE 1—FIRST ASPECT OF THE INVENTION

Ceramic pieces as shown in Table 1 were molded under pressure, sintered, and polished on its surface to be formed with a metal film. Thereafter, the obtained ceramic body was subjected to a series of washing steps of neutral detergent washing, pure water washing, replacement of moisture by acetone, and drying with 1,1,1-trichloroethane and acetone. The thus washed ceramic body was placed as a substrate in a vacuum vessel of a vacuum deposition device (EBV-6DH manufactured by Nippon Shinku Gijutsu K.K.), which was in turn reduced to a pressure of $10^{-6}$ Torr and heated to melt and deposit onto the ceramic body the elements from Groups IVa, VIa and Ib in that order, by electron beam deposition, thereby forming a metal film of three metal layers with each thickness as shown in Table 1 on the ceramic body. Onto the thus obtained metal films were laminated metal members as shown in Table 1 respectively at about 850 C.° in a $H_2$ atmosphere by silver brazing. Table 1 shows the results of testing with the samples obtained in Example 1 and the comparative examples.

As will be evident from the results given in Table 1, samples Nos. 1 to 5 and 10 to 11 according to the first aspect of the present invention are superior to other samples in that the metal plates are very firmly bonded to ceramics through the metal films, and exhibit high durability upon heat treatment.

EXAMPLE 2—SECOND ASPECT OF THE INVENTION

In accordance with Example 1, the starting ceramic pieces as shown in Table 2 were subjected to washing. With a similar vacuum vessel, the elements from Groups IVa, VIa, VIII and Ib were then deposited onto the ceramic body in that order under similar conditions, thereby forming a metal film of four metal layers. Onto the metal film was laminated a copper member similar to that of Example 1 in accordance with Example 1.

For the purpose of comparison, a metal film of a first titanium layer and a second copper layer—known as the process for metallizing the surface of ceramics—was formed on the surface of ceramics according to the foregoing examples. For the purpose of another comparison, different metal plates were laminated onto the metal film of Example 1 in lieu of the copper plate.

In Examples 1 and 2 and the comparative examples, the following bonding strength testing was carried out with varied types of ceramics, identical metal layers, varied types of metal plates having varied thickness. In Table 2 the results of testing with the samples obtained in Example 2 and comparative tests are presented.

BONDING STRENGTH TESTING

As shown in the end view of the FIGURE, a nickel plate 6 was bonded to each of the metal plates 4 obtained in Examples 1 and 2 and the comparative examples by silver brazing 5 to form test pieces. The dimensions of the ceramics and the nickel plate were 10 mm $\times$ 10 mm $\times$ 5 mm, while the thickness of the silver brazing 5 was 0.03 mm. The shear strength of some test pieces was measured, along with that of other pieces upon heat treatment at 600° C. for 2 hours.

As will be apparent from the results given in Table 2, the metal plates are very firmly bonded to ceramics through the metal films in samples Nos. 21 to 26 according to the second aspect of the present invention. The durability of these samples upon heat treatment is higher than that of Example 1.

TABLE 1

| Sample No. | Ceramics | Metal Film 1st layer | 2nd layer | 3rd layer | Metal Member (thickness mm) | Shear Strength (kg/mm$^2$) | Shear Strength upon Heat Treatment (kg/mm$^2$) |
|---|---|---|---|---|---|---|---|
| 1 | $Si_3N_4$ | Ti 1000 Å | Mo 1000 Å | Cu 20000 Å | Cu (0.25) | >10 | >9.7 |
| 2 | " | Ti 1000 Å | Mo 1000 Å | Cu 20000 Å | Cu (0.4) | >10 | >9.7 |

TABLE 1-continued

| Sample No. | Ceramics | Metal Film 1st layer | 2nd layer | 3rd layer | Metal Member (thickness mm) | Shear Strength (kg/mm$^2$) | Shear Strength upon Heat Treatment (kg/mm$^2$) |
|---|---|---|---|---|---|---|---|
| 3 | " | Ti 1000 Å | Mo 1000 Å | Cu 20000 Å | Cu (0.8) | >10 | >9.7 |
| 4 | " | Ti 1000 Å | Mo 1000 Å | Cu 20000 Å | Cu (1.5) | >10 | >9.7 |
| 5 | " | Ti 1000 Å | Mo 1000 Å | Cu 20000 Å | Cu/Invar/ Cu(1.0) | 7.8 | 7.6 |
| 6 | " | Ti 1000 Å | Mo 1000 Å | Cu 20000 Å | Fe—Ni 42%(0.4) | 0.7 | — |
| 7 | " | Ti 1000 Å | Mo 1000 Å | Cu 20000 Å | Kovar (0.25) | 1.0 | — |
| 8 | " | Ti 1000 Å | Mo 1000 Å | Cu 20000 Å | Kovar (0.4) | 4.5 | — |
| 9 | " | Ti 1000 Å | Mo 1000 Å | Cu 20000 Å | Mo (0.25) | 1.8 | — |
| 10 | ZrO$_2$ | Ti 1000 Å | Mo 1000 Å | Cu 20000 Å | Cu (0.4) | >10 | >9.7 |
| 11 | Al$_2$O$_3$ | Ti 1000 Å | Mo 1000 Å | Cu 20000 Å | Cu (0.8) | >10 | >9.7 |
| 12 | Si$_3$N$_4$ | Ti 1000 Å | none | Cu 2000 Å | none | <2 | — |

Samples Nos. 1–5 and 10 to 11: Instant samples,
Samples Nos. 6–9 and 12: Comparative samples

TABLE 2

| Sample No. | Ceramics | Metal Film 1st layer | 2nd layer | 3rd layer | 4th layer | Metal Member (thickness mm) | Shear Strength (kg/mm$^2$) | Shear Strength upon Heat Treatment (kg/mm$^2$) |
|---|---|---|---|---|---|---|---|---|
| 21 | Si$_3$N$_4$ | Ti 1000 Å | Mo 1000 Å | Ni 1000 Å | Cu 20000 Å | Cu (0.25) | >10 | >10 |
| 22 | " | Ti 1000 Å | Mo 1000 Å | Ni 1000 Å | Cu 20000 Å | Cu (0.4) | >10 | >10 |
| 23 | " | Ti 1000 Å | Mo 1000 Å | Ni 1000 Å | Cu 20000 Å | Cu (0.8) | >10 | >10 |
| 24 | " | Ti 1000 Å | Mo 1000 Å | Ni 1000 Å | Cu 20000 Å | Cu (1.5) | >10 | >10 |
| 25 | ZrO$_2$ | Ti 1000 Å | Mo 1000 Å | Ni 1000 Å | Cu 20000 Å | Cu (0.4) | >10 | >10 |
| 26 | Al$_2$O$_3$ | Ti 1000 Å | Mo 1000 Å | Ni 1000 Å | Cu 20000 Å | Cu (0.8) | >10 | >10 |

We claim:

1. A metal-ceramic composite material, comprising:
   a ceramic substrate,
   a metal film formed on a surface of said ceramic substrate, comprising:
      a first layer formed on the surface of the ceramic substrate by gas deposition, consisting essentially of at least one of titanium, zirconium, hafnium and an alloy thereof;
      a second layer formed on the first layer by gas deposition, consisting essentially of at least one of chromium, molybdenum, tungsten and an alloy thereof;
      a third layer formed on the second layer by one of gas deposition and electrochemical plating, consisting essentially of at least one of copper, silver, gold and an alloy thereof; and
   a metal member consisting essentially of at least one of copper, gold, silver, platinum and an alloy thereof, laminated onto said metal film.

2. A metal-ceramic composite material, comprising:
   a ceramic substrate,
   a metal film formed on a surface of said ceramic substrate, comprising:
      a first layer formed on the surface of the ceramic substrate by gas deposition, consisting essentially of at least one of titanium, zirconium, hafnium and an alloy thereof;
      a second layer formed on the first layer by gas deposition, consisting essentially of at least one of chromium, molybdenum, tungsten and an alloy thereof;
      a third layer formed on the second layer by gas deposition, consisting essentially of at least one of iron, cobalt, nickel, ruthenium, rhodium, palladium, osmium, iridium, platinum and an alloy thereof;
      a fourth layer formed on the third layer by one of gas deposition and electrochemical plating, consisting essentially of at least one of copper, silver, gold and an alloy thereof; and
   a metal member consisting essentially of at least one of copper, silver, gold, platinum and an alloy thereof, laminated onto said metal film.

3. A metal-ceramic composite material as defined in claim 1 or 2, wherein the metal member is laminated to the metal film by one of brazing and hot pressing.

4. A metal-ceramic composite material as defined in claim 1 or 2 wherein the gas deposition is selected from the group consisting of vacuum deposition, vacuum plating, ion beam deposition, sputtering, chemical vapor deposition, and ion plating.

5. A metal-ceramic composite material as defined in claim 1 or 2, wherein the layer consisting essentially of at least one of copper, silver, gold and an alloy thereof is deposited by one of electroplating and electroless plating.

6. A metal-ceramic composite material as defined in claim 1 or 2, wherein the ceramic substrate is a sintered body of at least one of a nitride, a carbide, an oxide, and a mixture thereof.

7. A metal-ceramic composite material as defined in claim 6, wherein the ceramic substrate is a sintered body of one of silicon nitride, zirconia, alumina and silicon carbide.

8. A metal-ceramic composite material as defined in claim 1 or 2, wherein the first layer has a thickness of about 500 to about 5000 Å.

9. A metal-ceramic composite material as defined in claim 1 or 2, wherein the second layer has a thickness of about 500 to about 5000 Å.

10. A metal-ceramic composite material as defined in claim 1, wherein the third layer has a thickness of about 1 to about 20 microns.

11. A metal-ceramic composite material as defined in claim 2, wherein the fourth layer has a thickness of about 1 to about 20 microns.

12. A metal-ceramic composite material as defined in claim 2, wherein the third layer has a thickness of about 500 to about 5000 Å.

13. A metal-ceramic composite material as defined in claim 1 or 2, wherein the metal member acts as an interposed damping member for bonding other material.

14. A metal-ceramic composite material as defined in claim 1 or 2, wherein the metal member acts as a conductive member.

15. A metal-ceramic composite material as defined in claim 13, wherein the metal member is at least about 0.01 mm thick.

* * * * *